(12) United States Patent
Lermer et al.

(10) Patent No.: US 12,106,010 B2
(45) Date of Patent: Oct. 1, 2024

(54) ARRANGEMENT OF AUDIO DEVICES, CONFIGURATION APPARATUS, METHOD AND COMPUTER PROGRAM

(71) Applicant: Robert Bosch GmbH, Stuttgart (DE)

(72) Inventors: Franz Lermer, Pilsting-Ganacker (DE); Christian Huber, Ganacker (DE); Peter Reislhuber, Laberweinting (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 17/617,283

(22) PCT Filed: May 25, 2020

(86) PCT No.: PCT/EP2020/064369
§ 371 (c)(1),
(2) Date: Dec. 7, 2021

(87) PCT Pub. No.: WO2020/249377
PCT Pub. Date: Dec. 17, 2020

(65) Prior Publication Data
US 2022/0229630 A1      Jul. 21, 2022

(30) Foreign Application Priority Data
Jun. 11, 2019   (DE) .................... 10 2019 208 461.3

(51) Int. Cl.
*G06F 3/16*          (2006.01)
*H04R 5/04*          (2006.01)
(52) U.S. Cl.
CPC ............... *G06F 3/165* (2013.01); *H04R 5/04* (2013.01); *H04R 2420/03* (2013.01)

(58) Field of Classification Search
CPC ...... H04H 60/04; H04R 5/04; H04R 2430/01; H04R 27/00
(Continued)

(56) References Cited

U.S. PATENT DOCUMENTS

2008/0181424 A1 *  7/2008  Schulein ................ H03G 7/002
                                                     381/74
2009/0276721 A1   11/2009  Brockbank
(Continued)

FOREIGN PATENT DOCUMENTS

DE    102017209067 A1   12/2018
EP        3098986 A1   11/2016

OTHER PUBLICATIONS

Translation of International Search Report for Application No. PCT/EP2020/064369 dated Sep. 23, 2020 (2 pages).

*Primary Examiner* — Alexander Krzystan
(74) *Attorney, Agent, or Firm* — Michael Best & Friedrich LLP

(57) ABSTRACT

The invention relates to an arrangement (4) of audio devices for the purpose of a public address system, comprising an audio-signal processing apparatus (5) and a configuration apparatus (6), wherein: the audio-signal processing apparatus (5) comprises a first plurality of audio-signal inputs (10), a second plurality of signal outputs (11) and a third plurality of signal paths (9); the signal paths (9) connect audio-signal inputs (10) to signal outputs (11); the audio-signal inputs (10) are designed to pick up a provided audio signal; the configuration apparatus (6) is designed for open-loop control, closed-loop control and/or configuration of the audio-signal processing apparatus (5); the configuration apparatus (6) is designed to switch off signal paths (9), in particular unused and/or undesired signal paths.

13 Claims, 2 Drawing Sheets

(58) Field of Classification Search
USPC .......................................... 381/119; 700/94
See application file for complete search history.

(56) References Cited

U.S. PATENT DOCUMENTS

| | | | |
|---|---|---|---|
| 2010/0246833 A1* | 9/2010 | Hagiwara | H04S 5/005 381/18 |
| 2012/0275626 A1* | 11/2012 | Miura | H04H 60/04 381/119 |
| 2014/0254820 A1* | 9/2014 | Gardenfors | H04M 3/42221 381/80 |
| 2014/0380159 A1 | 12/2014 | Reilly et al. | |
| 2021/0185440 A1* | 6/2021 | Mackay | H01L 21/76814 |

* cited by examiner

ARRANGEMENT OF AUDIO DEVICES, CONFIGURATION APPARATUS, METHOD AND COMPUTER PROGRAM

BACKGROUND OF THE INVENTION

An arrangement of audio devices for a public address system is proposed, wherein the arrangement of audio devices has a configuration apparatus and an audio signal processing apparatus, wherein the audio signal processing apparatus has a plurality of audio signal inputs and/or audio signal outputs.

Environmental awareness and, in particular, energy saving are becoming increasingly important in all areas of our daily life. Thus, energy saving has also reached the domain of audio technology. A large amount of energy is required, particularly in professional audio technology, in which an environment, in particular an environment of considerable size, is provided with sound by means of a public address system. Not only are the sound output units such as loudspeakers supplied with electricity. The actual control of the loudspeakers and the mixing of audio signals are also electro-intensive. The loudspeakers are provided with sound, for example, with an arrangement of audio devices. An arrangement of audio devices of this type is, for example, a mixing console which comprises audio signal processors and/or system controllers. The arrangement of audio devices comprises audio signal inputs and audio signal outputs which are connected by means of signal paths. The signals present at the audio signal inputs can be processed with audio processors, for example digital mixers, and can be emitted accordingly at the audio signal outputs. An arrangement of this type is highly electro-intensive due to the constant full energy supply.

Document DE 10 2017 209 067 A1, which in fact constitutes the closest prior art, describes a method for operating a class D amplifier. The method provides that an applied audio signal is detected at a measurement location upstream in the signal path and a voltage requirement of the end stage is determined on the basis thereof. A limit is chosen from which an adjustment is made, for example, from a first voltage requirement to a higher voltage requirement. This design is based on the consideration that the voltage requirement is increased if a greater amplification is required, wherein the amplifier is operated below the limit value on an average and/or lower voltage requirement.

SUMMARY OF THE INVENTION

The object of the invention is to provide an arrangement of audio devices which enables the professional provision of sound in a public address system in a particularly energy-saving manner. In particular, it is provided that an arrangement of audio devices having a multiplicity of audio signal inputs is operated in such a way that it operates in an energy-efficient manner.

An arrangement of audio devices is proposed. A configuration apparatus 11, a method for configuring the audio signal processing apparatus, a computer program and a machine-readable storage medium having the computer program are further proposed. Preferred and/or advantageous embodiments of the invention are set out in the subclaims, the description and the attached figures.

The invention relates to an arrangement of audio devices for a public address system. The arrangement of audio devices is designed, for example, to control a loudspeaker or a loudspeaker system. In particular, the arrangement of audio devices can comprise a mixing console or an amplifier. The arrangement of audio devices is designed especially to connect an audio signal source to the loudspeaker or loudspeaker system. In particular, the arrangement of audio devices is controllable, initializable and/or adjustable by means of a computer and/or a computer unit. A public address system is understood to mean, for example, the provision of a surrounding area with sound and/or audio signals, for example by means of a loudspeaker system. The surroundings to be provided with sound can, for example, be a building, a department store, an airport or other public building. The public address system can further be designed to provided sound for an outdoor area, for example a concert venue, a park area or a street.

The arrangement of audio devices comprises a configuration apparatus and an audio signal processing apparatus. The audio signal processing apparatus and configuration apparatus can especially be arranged in a common component, for example in a common housing. The configuration apparatus and the audio signal processing apparatus have an, in particular temporary, especially permanent, signal technology interconnection.

The audio signal processing apparatus has a first plurality of audio signal inputs, a second plurality of signal outputs and a third plurality of signal paths. The first plurality is, in particular, a number greater than five and especially a number greater than ten. The second plurality is, in particular, a number greater than five and especially a number greater than ten. In particular, it can be provided that the first plurality corresponds to the second plurality. The third plurality is, in particular, a number greater than five and especially a number greater than ten. The third plurality can especially correspond to the second plurality and/or the first plurality. The audio signal inputs are designed, in particular, as interfaces, for example as jack plugs, Chinch interfaces, AUX inputs and/or radio interfaces. The audio signal inputs are connectable, for example, to a sound generator and/or audio signal generator. The signal outputs are designed to emit a data signal. The data signal emittable by the signal outputs is, for example, a digital or analog signal. The data signal emittable by the signal outputs is especially an audio signal. In particular, different data signals are emitted at different signal outputs.

The signal paths are designed, in particular, as electronic signal paths, for example as wired paths or as conductor paths. The signal paths are designed, for example, as electrical circuits and/or comprise electric circuits. An audio signal can be forwarded along the signal paths and/or by means of the signal paths from the audio signal inputs to the signal outputs. The signal paths are designed to connect at least one audio signal input to at least one signal output. In particular, a signal path can also forward a plurality of audio signal inputs to a common signal output and/or can connect them. The signal paths can further be designed as branched signal paths. In particular, the signal path can have elements for signal processing, for example signals of different audio signal inputs can thus be mixed to form a common signal.

The audio signal outputs are designed to pick up a provided audio signal. The provided audio signal is, in particular, an externally provided audio signal. The audio signal can comprise a digital or analog signal. The audio signal output can especially be designed to convert an analog audio signal into a digital audio signal or a digital audio signal into an analog audio signal.

The configuration apparatus is designed to control, adjust and/or configure the audio signal processing apparatus. The configuration apparatus comprises and/or is designed, for example, as a computer apparatus. The configuration apparatus can comprise, for example, a software module and especially a GUI (Graphical User Interface). A user can, for example, control, adjust, initialize and/or configure the audio signal processing apparatus by means thereof, wherein the user interaction takes place especially by means of the GUI. In particular, individual signal paths, individual audio signal inputs and/or individual signal outputs are controllable, adjustable and/or configurable by means of the configuration apparatus. The configuration apparatus can be designed, for example, as a digital mixing console and/or virtual mixing console. Control and/or adjustment parameters, for example, of the audio signal processing apparatus and/or of the arrangement of audio devices are adjustable, controllable and/or configurable by means of the configuration apparatuses.

The configuration apparatus is designed to switch off, in particular selectively and/or individually switch off, in particular unused and/or unwanted signal paths. Unused and/or unwanted signal paths are, for example, those paths which connect an audio signal input to a signal output, wherein no audio signal is present and/or provided at the audio signal input concerned. Only a subset, for example, of the first plurality of audio signal inputs is supplied with audio signals and/or is connected to audio sources, wherein the remainder of the first plurality is unconnected. Such audio signal inputs without a provided audio signal lead, in particular, to unused and/or unwanted signal paths. It can further be provided that unused signal paths are those which are not required and/or used in the instantaneous and/or planned intended sound provision, since the output signals and/or audio signals thereof are not intended to be emitted. A switch-off of the signal paths is to be understood, for example, to mean a transfer of the signal paths to a de-energized state. The signal paths are, for example, disconnected from the energy supply, disconnected from voltage sources and/or de-energized for this purpose. The switch-off can be performed or controlled manually or automatically.

The invention is based on the consideration that all signal paths are seldom used simultaneously in arrangements of audio devices. However, all signal paths are supplied with current and/or voltage in existing arrangements of audio devices, so that they consume energy unnecessarily when they are idle. It is possible to improve the energy requirement of the arrangement of audio devices by switching off the corresponding unused signal paths. In particular, during the control, adjustment and/or configuration, the configuration apparatus knows which signal paths are used and/or which audio signal inputs and/or signal outputs are active. The configuration apparatus can therefore also control the switch-off of unused signal paths and/or can determine which signal paths are to be understood as unused and/or unwanted signal paths.

One design of the invention provides that the configuration apparatus is designed to perform the switch-off of the signal paths following a start of the configuration apparatus, the arrangement of audio devices and/or the audio signal processing apparatus. In particular, this can also be performed during an initialization of the configuration apparatus, the audio signal processing apparatus and/or the arrangement of audio devices. One special design of the invention provides that a switch-off of the signal paths takes place in the event of a configuration change, for example of the audio processing apparatus, the configuration apparatus and/or the arrangement of audio devices. This design is based on the consideration that, in the event of a change of operation, change of configuration and/or recommissioning, the optimum level of switch-off of signal paths is always provided.

It is optionally provided that the configuration apparatus is designed to activate and/or reactivate, in particular selectively and/or individually activate and/or reactivate, in particular, wanted and/or required, switched-off signal paths. The configuration apparatus can be designed, for example, to activate a previously switched-off signal path, for example to supply it with voltage and/or current once more so that this signal path can then actively participate. This may be necessary, for example, if a further signal path is required, for example because an audio signal input is supplied once more with an audio signal so that this audio signal input is newly added and its signal path is to be taken into account.

It is particularly preferred that the configuration apparatus has an input unit. The input unit can comprise, for example, a keypad or a touchpad with a graphical user interface. A user can set and/or select configuration profiles by means of the input unit. Said user can, for example, freely set configuration profiles and/or create a new profile. It can further be provided that configuration profiles are selectable from a list, wherein these configuration profiles have presettings and especially are adaptable. The configuration profiles comprise information relating to signal paths that are used, unused, to be switched off, switched off and/or active. The configuration profiles can further comprise information relating to used audio signal inputs and/or signal outputs, indicating, for example, which audio signal inputs and/or signal outputs are currently supplied with audio signals and/or are externally connected. The configuration profiles can further comprise information relating to signal paths, indicating, for example, which signal path connects which audio signal inputs to which signal outputs and which elements or circuit components are arranged within the signal path. The configuration apparatus is designed, in particular, to perform the switch-off and/or the activation of signal paths on the basis of the configuration profiles. The configuration apparatus is designed, for example, to leave as active the signal paths which are defined as used in the configuration profiles and/or to switch off those which are defined as unused signal paths. It can be provided, for example, that signal paths that are no longer used following the changeover from a first configuration profile to a second configuration profile are switched off and new and/or added signal paths which were previously switched off are now reactivated. The configuration profiles can be designed and/or stored, for example, as user profiles. The configuration profiles can further comprise and/or describe, for example, sound provision scenarios.

It is particularly preferred that at least one of the configuration profiles is designed as a time-dependent configuration profile. A time-dependent configuration profile is to be understood to mean, in particular, that signal paths that are unused and/or to be switched off are activated and/or active during a time period and/or at a specific time. It can further be understood to mean, for example, that an active signal path is to be switched off at a later time, for example after a defined time interval and/or at a definable time. The configuration profile can take into account, for example, that audio signals originate from an audio source 1 up to a certain time during an event, wherein the audio signal source 1 is connected to a subset of the plurality of audio signal inputs, wherein an audio signal source 2 which is connected to a different subset of audio signal inputs provides the audio signal at a later time.

It is particularly preferred that the configuration apparatus comprises a computer unit. The computer unit is, for example, a personal computer, a tablet and/or a laptop. The computer unit is, in particular, connectable, in particular connectable using data technology, for example by means of a cable connection or a radio link, to the audio signal processing apparatus. The configuration and/or management, setting and/or selection of the configuration profiles can be designed and/or implemented, in particular, through software.

It is optionally provided that the signal paths and/or at least one signal path have/has current-operated circuit components. Current-operated circuit components are, for example, microprocessors, audio signal processors, digital-to-analog converters, analog-to-digital converters, operational amplifiers and/or signal processing elements. A switch-off of a signal path is understood to mean, for example, that the current-operated circuit components are voltage-free and/or current-free in this state, for example are disconnected from the voltage and/or current supply.

It is particularly preferred that the arrangement of audio devices comprises a mixing console. The mixing console is designed, for example, as the audio signal processing apparatus and/or the mixing console comprises the audio signal processing apparatus. The mixing console can have, for example, an amplifier and/or sound conversion elements.

It is particularly preferred that the signal paths, the audio signal inputs and/or signal outputs have a measurement unit. The measurement unit is designed to detect whether an audio signal is present. The measurement unit can be designed, for example, as a current and/or voltage detection unit. The measurement unit is further designed to provide a measurement signal to the configuration apparatus, particularly if an audio signal has been detected. The configuration apparatus is designed, for example, to control the switch-off and/or activation of the signal paths on the basis of the measurement signal. The configuration apparatus can interpret a measurement signal in such a way that the associated signal path is required and is, for example, to be activated and/or energized.

A configuration apparatus for an arrangement of audio devices forms a further subject-matter of the invention. The configuration apparatus is designed, for example, as a computer unit. The configuration apparatus can further be designed as a software module. The configuration apparatus is designed to have a data connection and/or control connection to the audio signal processing apparatus. The configuration apparatus is designed to deactivate, in particular individually and/or selectively, an unwanted and/or unused signal path. The configuration apparatus can further be designed to reactivate a switched off but now required signal path. The configuration apparatus forms, for example, an energy management system for the arrangement of audio devices and/or for the audio signal processing apparatus. The configuration apparatus is especially designed to determine and/or switch off signal paths which are to be switched off on the basis of the audio signal inputs supplied with audio signals, signal outputs and/or the configuration profiles.

The invention further relates to a method for configuring an audio signal processing apparatus. The method is carried out, for example, by means of the configuration apparatus as previously described. The method provides that signal paths of an arrangement of audio devices and, in particular, of an audio signal processing apparatus are deactivated and/or switched off if they are not required and/or used. In particular, a signal path is switched off and, if necessary, switched on and/or activated on the basis of configuration profiles.

A computer program for execution on a computer and/or on a configuration apparatus forms a further subject-matter of the invention. A computer is understood to mean, in particular, the computer unit as previously described. The computer program is designed to carry out the method as previously described and/or to control the audio signal processing device, to activate and/or deactivate signal paths on the basis of the method as previously described.

A machine-readable storage medium, in particular a non-volatile machine-readable storage medium, forms a further subject-matter of the invention. The machine-readable storage medium is, for example a memory stick, a USB stick, a data carrier diskette, a hard disk, a flash memory and/or a CD. The machine-readable storage medium comprises the computer program as previously described, wherein the computer program is stored on the machine-readable storage medium.

BRIEF DESCRIPTION OF THE DRAWINGS

Further advantages, effects and designs can be found in the attached figures and their description, wherein.

DETAILED DESCRIPTION

Figure 1:
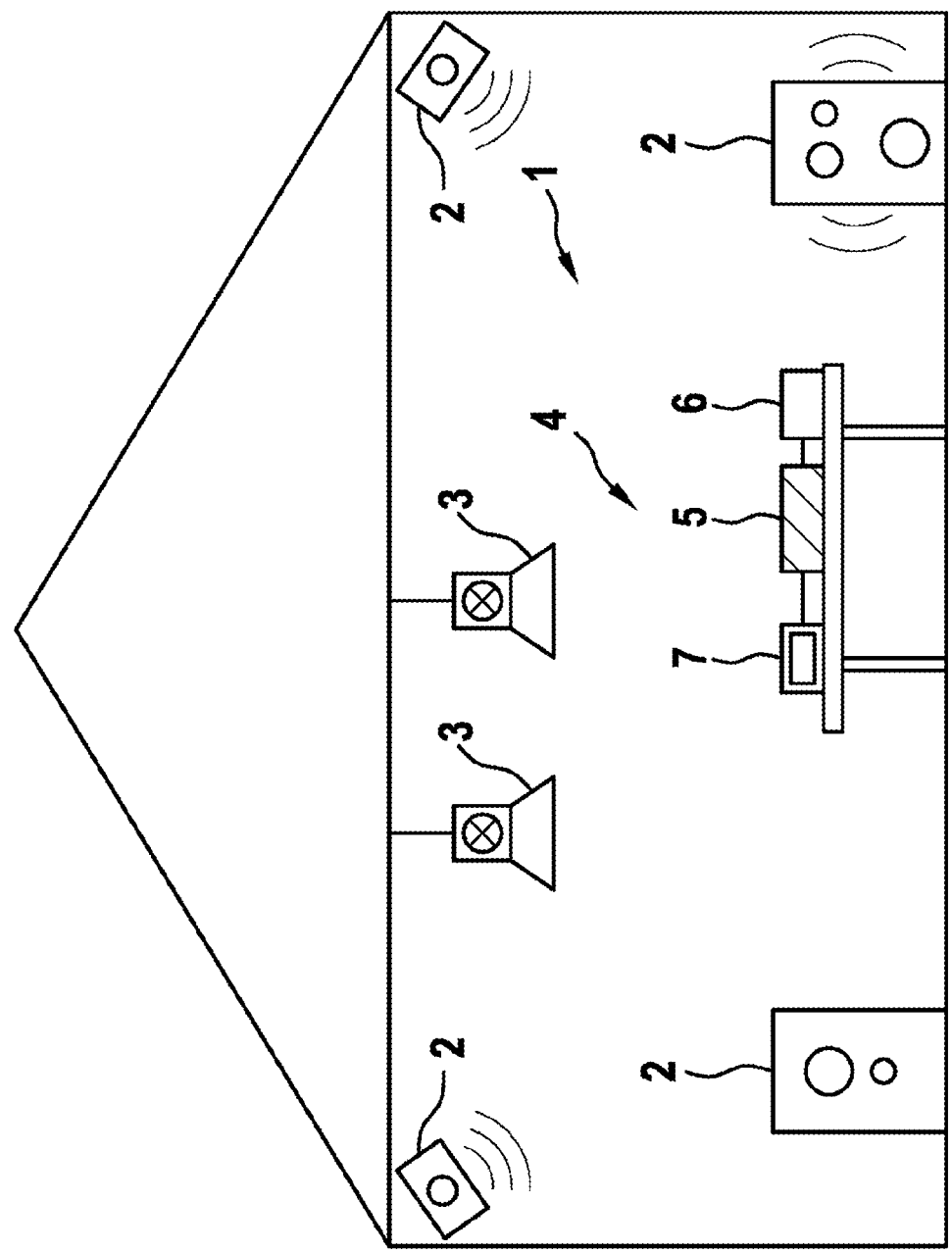
FIG. 1 shows schematically a design of the public address system with an example of an arrangement of audio devices.

FIG. 1 shows schematically a design for the public address system of a sound environment 1. The sound environment 1 is, for example, an indoor space such as a concert hall. Alternative sound environments can also include outdoor areas such as open-air events or sound provision for announcements in public places. The sound environment 1 is provided with sound using a plurality of loudspeakers 2. The loudspeakers 2 are spatially distributed, in particular for creating a spatial effect and/or for realistic reproduction of an audio signal. The loudspeakers 2 together form a loudspeaker system. Light effect sources 3, for example illumination lamps, strobe lights and/or other light effects, are further arranged in the sound environment. The audio signal reproduced by the loudspeakers 2 can be visually supported or underpinned by means of the light effect sources 3.

The loudspeakers 2 and/or the light effect sources 3 are adjusted and/or controlled, in particular, by means of the arrangement 4 of audio devices. The arrangement 4 of audio devices can be disposed within the sound environment 1, for example as a mixing console in situ. Alternatively, the arrangement 4 of audio devices can be disposed externally, for example in a control center, even in a different country. The arrangement 4 of audio devices has a signaling connection to the loudspeakers 2 and/or to the light source 3, for example wireless and/or wired.

In this representation, the arrangement 4 of audio devices is disposed on a desk and comprises an audio signal processing apparatus 5, a configuration apparatus 6 and an audio source 7. In particular, the audio source 7 and the configuration apparatus 6 have a data connection, for example by means of a cable link, to the audio signal processing apparatus 5, wherein this connection can be provided temporarily, for example for setting purposes, or can be implemented permanently, if, for example, a readjustment and/or further configuration of the audio signal processing apparatus 5 by means of the configuration apparatus 6 is necessary. The configuration apparatus 6 serves to configure, set and/or operate the audio signal processing apparatus 5. The audio signal processing apparatus 5 can be designed as a mixing console and the configuration apparatus 6 as a computer unit, for example as a tablet computer, a notebook or a central computer. The configuration apparatus 6 can further be designed as a smartphone. The audio source 7 can be designed as a CD player and/or DVD player, MIP 3 player or a live audio source.

Figure 2:
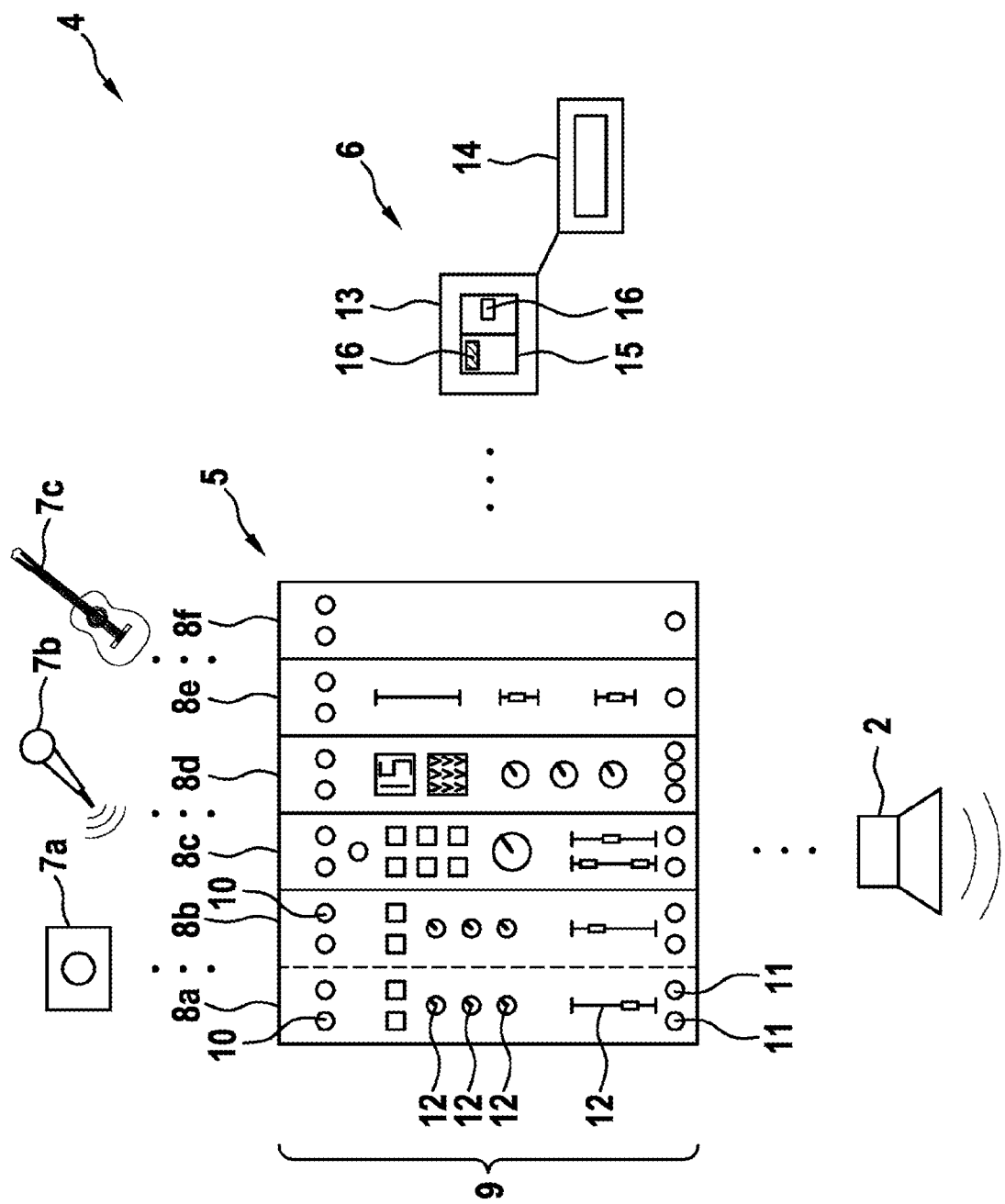
FIG. 2 shows an arrangement of audio devices as one example embodiment of the invention.

FIG. 2 shows schematically an arrangement 4 of audio devices. The arrangement 4 of audio devices comprises an audio signal processing apparatus 5 and a configuration apparatus 6.

The audio signal processing apparatus 5 is designed here as a mixing console. The audio signal processing apparatus 5 comprises a plurality of lines 8a-8f. The lines 8 in each case comprise and/or define one or more signal paths 9. The lines 8a-8f in each case comprise at least one audio signal input 10, at least one signal output 11, wherein at least one signal path 9 extends from the audio signal input 10 to the signal output 11. One or more circuit components 12 can be disposed along the signal path 9. The circuit components 12 can be analog circuit components such as resistors, controllers, operational amplifiers, transistors or switches. The circuit components 12 can further comprise digital circuit components such as signal processors, analog-to-digital converters or digital-to-analog converters. The signal path 9 is energized and/or active in operation so that the circuit components 12 are supplied with the necessary operating voltage or operating energy. An audio signal applied to an audio signal input 10 or different audio signals applied to different audio signal inputs 10 can be processed, mixed and/or converted by means of the circuit components 12 along the signal path. The signal emitted at the signal output 11 can comprise an audio signal. Alternatively, however, the signal can be a different data signal, for example to control the light effect source 3.

The audio signal inputs 10 are connectable, for example by means of cable lines or by means of radio links, to audio signal sources 7a, 7b and 7c. The audio signal source 7a comprises, for example, a digital audio signal source, for example a CD player, a computer or MP3 player. The audio signal source 7b is, for example, a microphone for transmitting presentations and/or announcements. Instruments, such as, for example, a guitar as the audio signal source 7c, can further serve as audio signal sources. The audio signal provided by the audio signal sources 7a-7c can be received by the audio signal inputs 10 as an analog or digital signal. This audio signal is then forwarded in converted or unconverted form via the signal path 9 to the signal outputs 11. These signals can be emitted by the signal outputs 11 by means of cable connections or radio links on loudspeakers 2 or at the light effect source or can be tapped there. In most applications, the mixing consoles and/or the audio signal processing apparatuses 5 are equipped with a multiplicity of lines 8, audio signal inputs 10 and signal outputs 11. The full potential is not usually used and/or exhausted during the use, since only a subset of the audio signal inputs 10 or lines 8 is required or used. It can be provided or implemented here, for example, that the audio signal source 7a is connected to the line 8a, the audio signal source 7b is connected to the line 8b and the audio signal source 7c is connected to the line 8c. The lines 8d, 8e and 8f are not used in this example embodiment. In the prior art, all lines have hitherto been operated with current, so that, in principle, all elements 12 are usable. However, after the lines 8d-8f have not been used and/or needed, a configuration apparatus 6 is provided that switches off the unused lines 8 or their signal paths 9. Here, the lines 8d, 8e and 8f would be switched off. The lines 8a, 8b and 8c or their signal paths 9 and/or circuit components 12 would continue to be regarded and/or operated as active by the configuration apparatus 6.

The configuration apparatus 6 is designed here as a computer unit. This comprises a display unit 13 and an input unit 14. In particular, the display unit 13 and the input unit 14 can be combined, for example in the form of a tablet and/or touchscreen. A GUI (graphical user Interface) 15, for example, can be displayed on the display unit 13. A configuration profile can be selected, defined and/or created anew by a user by means of the graphical user interface 15. The GUI can further comprise, for example, a representation of the audio signal processing apparatus 5. The user can select, for example, the inputs 10 and/or lines 8 which are actively used by means of the input unit 14 on this graphical representation 16. He can further specify, for example, which signal inputs 11 are used and/or needed. He can store this selection, for example, as a configuration profile which is also retrievable later. A configuration profile can be defined, for example, for an event type, for example the performance of a specific band with a specific line-up. The configuration apparatus 6 is designed to deactivate the lines 8d-8f and/or their signal paths 9 on the basis of the configuration profile if they are not stored in the configuration profile as used and/or needed. The configuration profile 16 can also comprise a time-dependent or dynamic configuration profile whereby, for example, 90 minutes after a start time, a different combination of lines 8, audio signal inputs 10 and signal outputs 11 is used and/or needed, so that, for example, hitherto deactivated signal paths 9 are activated and signal paths 9 which are no longer needed are deactivated. The configuration apparatus 6 can be understood to mean a control apparatus for the audio signal processing apparatus 5.

The invention claimed is:

1. An arrangement (4) of audio devices for a public address system, the arrangement comprising:
    an audio signal processing apparatus (5), a measurement unit, and a configuration apparatus (6), wherein the audio signal processing apparatus (5) has a first plurality of audio signal inputs (10), a second plurality of signal outputs (11) and a third plurality of signal paths (9), wherein the signal paths (9) connect audio signal inputs (10) to signal outputs (11),
    wherein the audio signal outputs (10) are configured to pick up a provided audio signal, wherein the configuration apparatus (6) is configured to control, adjust and/or configure the audio signal processing apparatus (5),
    wherein the measurement unit is configured to detect whether an audio signal is present on at least one selected from the group consisting of one of the signal paths (9), one of the audio signal inputs, and one of the signal outputs and to provide it as a measurement signal to the configuration apparatus (6),
    wherein the configuration apparatus (6) is configured to automatically switch off one or more of the signal paths (9) that are unused based on the measurement signal.

2. The arrangement (4) of audio devices as claimed in claim 1, wherein the configuration apparatus (6) is configured to perform the automatic switch-off of the signal paths (9) following at least one selected from the group consisting of a start of the configuration apparatus (6), an initialization of the configuration apparatus (6), and a configuration change.

3. The arrangement (4) of audio devices as claimed in claim 1, wherein the configuration apparatus (6) is configured to activate switched-off signal paths (9) that are wanted, required, or both.

4. The arrangement (4) of audio devices as claimed in claim 1, wherein the configuration apparatus (6) has an input unit (14) for setting configuration profiles, selecting configuration profiles, or both wherein the configuration profiles comprise information relating to signal paths (9) that are at least one selected from the group consisting of used, unused, to be switched off, switched off, and active, wherein the configuration apparatus (6) is configured to switch off the signal paths (9), activate the signal paths (9), or both based on the configuration profiles.

5. The arrangement (4) of audio devices as claimed in claim 4, wherein at least one configuration profile is configured as time-dependent, wherein the signal paths (9) stored and/or specified in the time-dependent configuration profile as used and/or unused are configured as time-dependent.

6. The arrangement (4) of audio devices as claimed in claim 1, wherein the configuration apparatus (6) comprises a computer unit.

7. The arrangement (4) of audio devices as claimed in claim 1, wherein the signal paths (9) have current-operated circuit components (12).

8. The arrangement (4) of audio devices as claimed in claim 7, wherein at least one of the circuit components (12) comprises a microcontroller or audio signal processor.

9. The arrangement (4) of audio devices as claimed in claim 1, wherein the audio signal processing apparatus (5) comprises a mixing console, an audio matrix and a multi-channel loudspeaker processor.

10. A configuration apparatus (6) for an arrangement (4) of audio devices as claimed in claim 1, wherein the configuration apparatus (6) is configured to automatically switch off at least one signal path (9).

11. A method for configuring an arrangement (4) of audio devices, wherein the arrangement (4) includes
an audio signal processing apparatus (5), a measurement unit, and a configuration apparatus (6),
wherein the audio signal processing apparatus (5) has a first plurality of audio signal inputs (10), a second plurality of signal outputs (11) and a third plurality of signal paths (9), wherein the signal paths (9) connect audio signal inputs (10) to signal outputs (11),
wherein the audio signal outputs (10) are configured to pick up a provided audio signal, wherein the configuration apparatus (6) is configured to control, adjust and/or configure the audio signal processing apparatus (5),
wherein the measurement unit is configured to detect whether an audio signal is present on at least one selected from the group consisting of one of the signal paths (9), one of the audio signal inputs, and one of the signal outputs and to provide it as a measurement signal to the configuration apparatus (6),
wherein the configuration apparatus (6) is configured to automatically switch off one or more of the signal paths (9) that are unused based on the measurement signal,
the method comprising automatically switching off at least one unused signal path (9) of the audio signal processing apparatus (5) between a first plurality of audio signal inputs (10) and a second plurality of signal outputs (11) based on the measurement signal.

12. A non-transitory, computer-readable storage medium, containing instructions that when executed by a computer cause the computer to control an arrangement (4) of audio devices to automatically switch off at least one unused signal path of a plurality of signal paths (9) of an audio signal processing apparatus (5) between a first plurality of audio signal inputs (10) and a second plurality of signal outputs (11) based on a measurement signal, wherein the arrangement (4) includes
the audio signal processing apparatus (5), a measurement unit, and a configuration apparatus (6),
wherein the audio signal processing apparatus (5) has the first plurality of audio signal inputs (10), the second plurality of signal outputs (11) and the plurality of signal paths (9), wherein the signal paths (9) connect audio signal inputs (10) to signal outputs (11),
wherein the audio signal outputs (10) are configured to pick up a provided audio signal, wherein the configuration apparatus (6) is configured to control, adjust and/or configure the audio signal processing apparatus (5), and
wherein the measurement unit is configured to detect whether an audio signal is present on at least one selected from the group consisting of one of the signal paths (9), one of the audio signal inputs, and one of the signal outputs and to provide it as the measurement signal to the configuration apparatus (6).

13. An arrangement (4) of audio devices for a public address system, the arrangement comprising:
an audio signal processing apparatus (5) and a configuration apparatus (6),
wherein the audio signal processing apparatus (5) has a first plurality of audio signal inputs (10), a second plurality of signal outputs (11) and a third plurality of signal paths (9), wherein the signal paths (9) connect audio signal inputs (10) to signal outputs (11),
wherein the audio signal outputs (10) are configured to pick up a provided audio signal, wherein the configuration apparatus (6) is configured to control, adjust and/or configure the audio signal processing apparatus (5),
wherein the configuration apparatus (6) is configured to switch off one or more of the signal paths (9),
wherein the signal paths (9) have current-operated circuit components (12) and the current-operated circuit components (12) are voltage-free and/or current-free in a switched-off signal path (9).

\* \* \* \* \*